Figure 7:
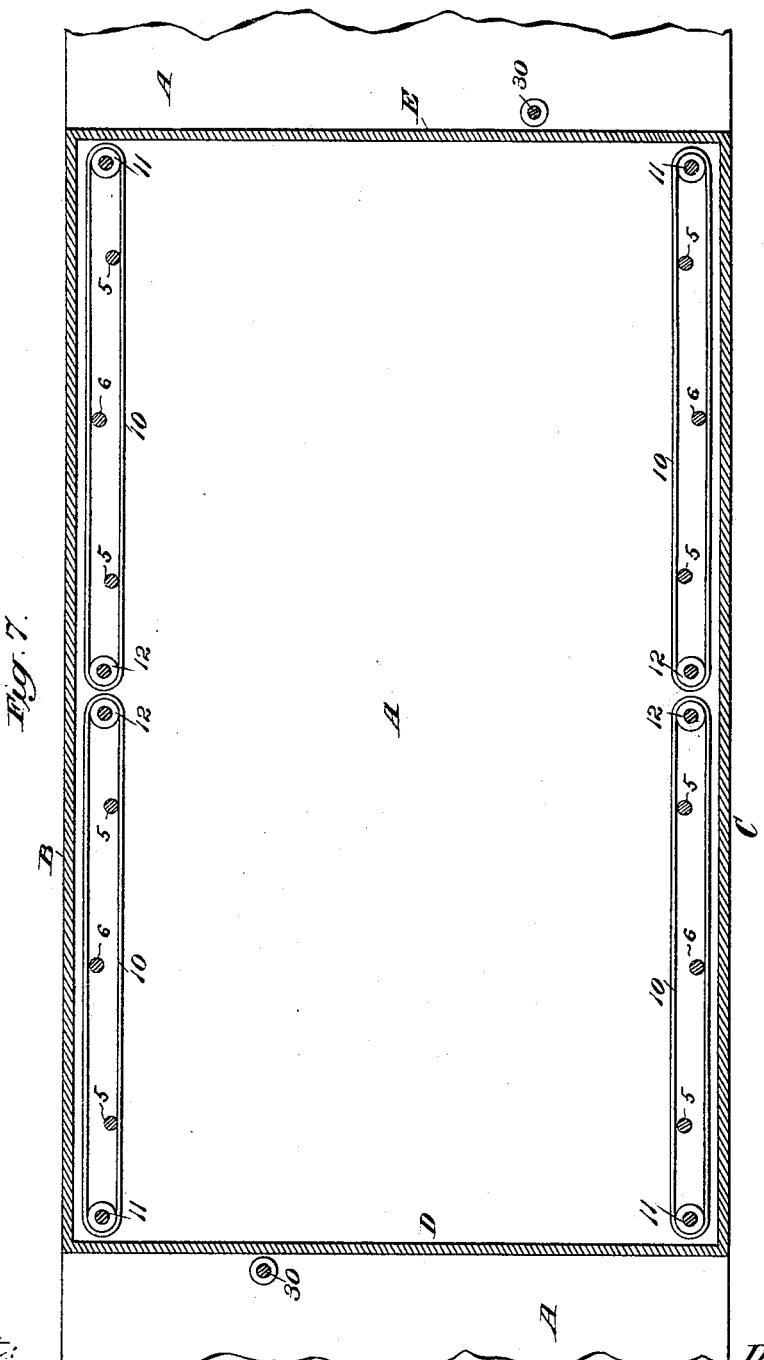

(No Model.)
G. M. TRAYLOR.
TRAVELING SIGN FOR RAILROAD CARS.
No. 332,306. Patented Dec. 15, 1885.
5 Sheets—Sheet 1.
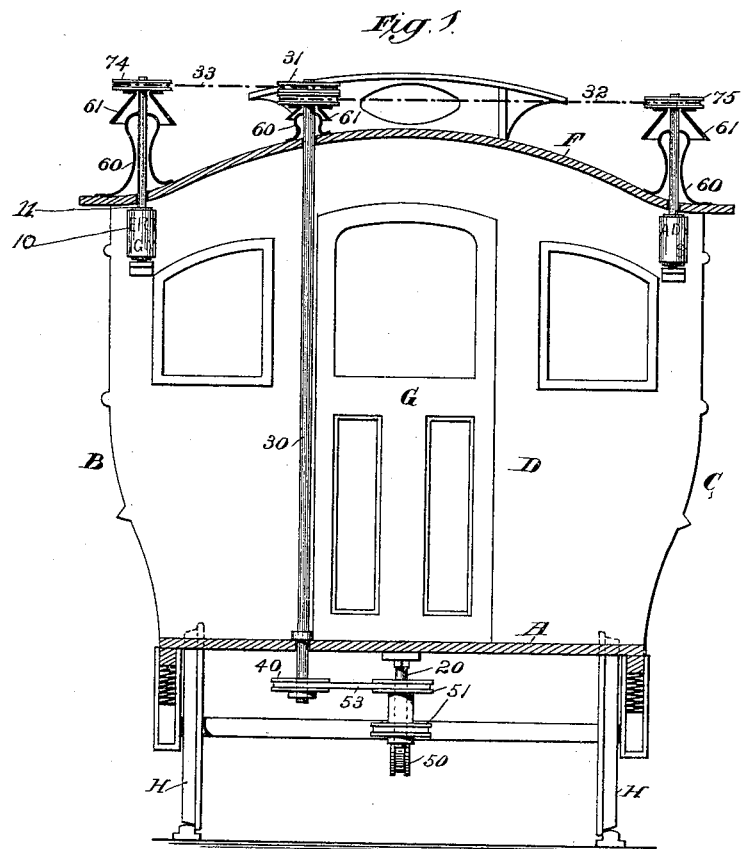
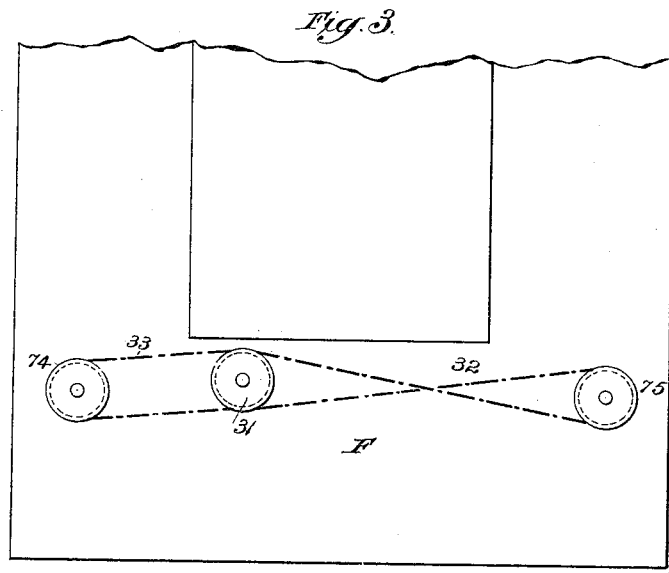
Attest:
Geo. H. Botts.
A. N. Jasbera.
Inventor:
George M. Traylor
by
Munson & Philipp
attys (No Model.)  5 Sheets—Sheet 2.
G. M. TRAYLOR.
TRAVELING SIGN FOR RAILROAD CARS.
No. 332,306.  Patented Dec. 15, 1885.
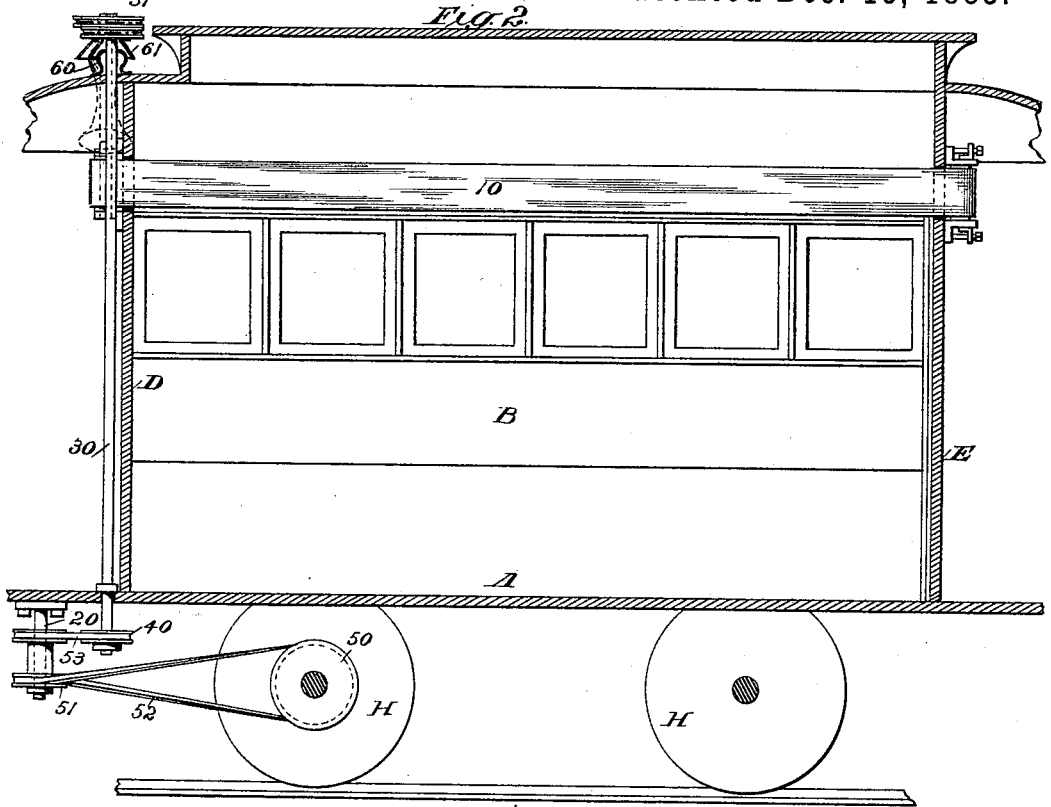
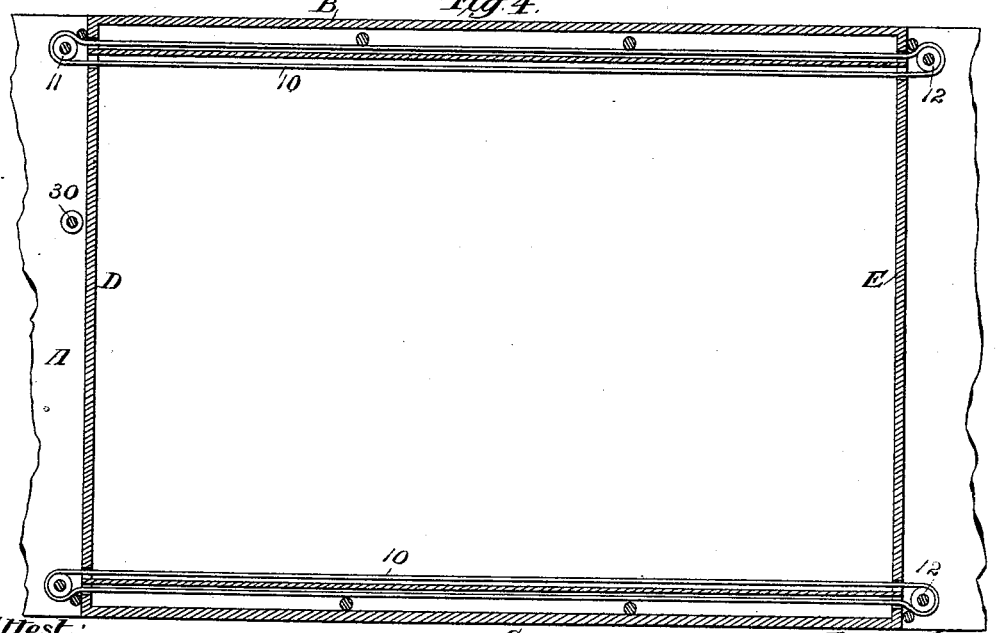
Attest:
Geo. H. Botts.
A. N. Jasbera
Inventor:
George M. Traylor
by Munson & Philipp
Atty.

(No Model.) 5 Sheets—Sheet 3.
G. M. TRAYLOR.
TRAVELING SIGN FOR RAILROAD CARS.
No. 332,306. Patented Dec. 15, 1885.
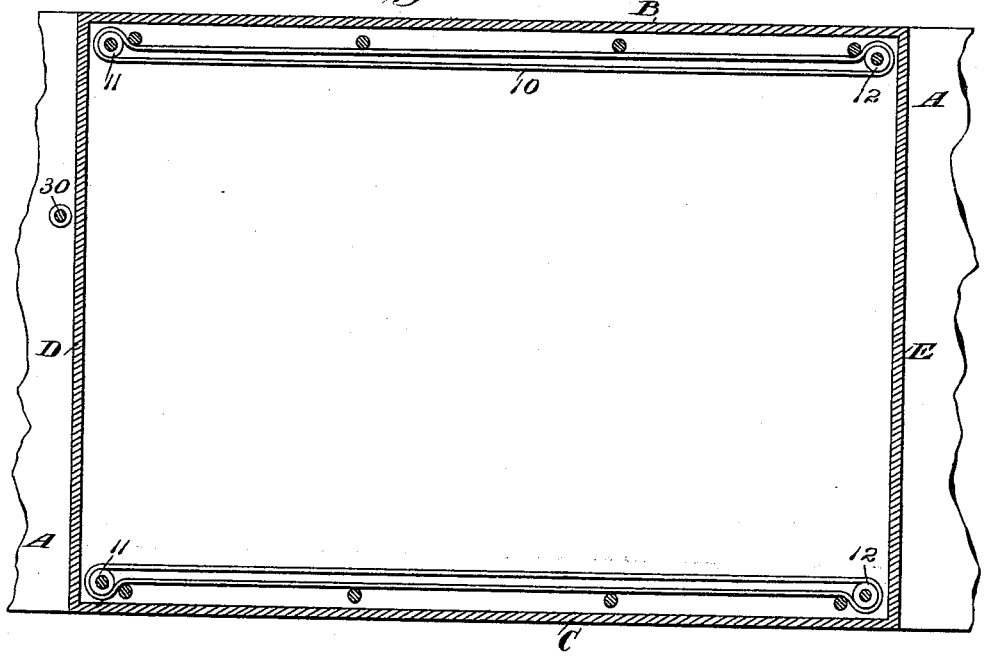
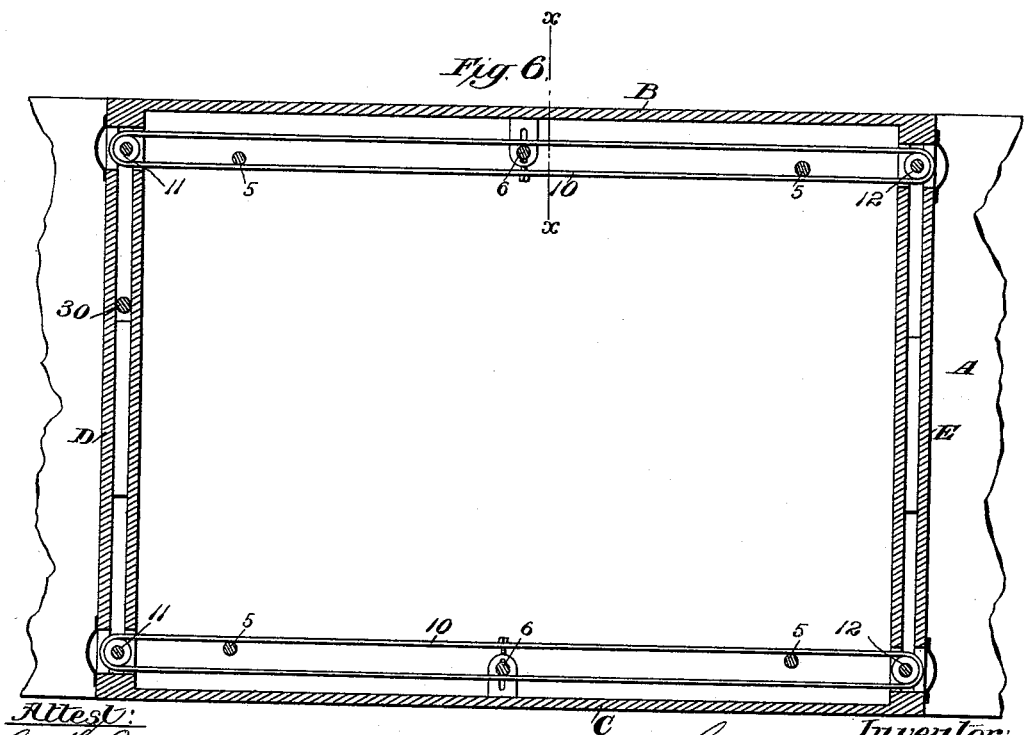

(No Model.) 5 Sheets—Sheet 4.

G. M. TRAYLOR.
TRAVELING SIGN FOR RAILROAD CARS.

No. 332,306. Patented Dec. 15, 1885.

Attest:
Geo. H. Botts.
A. N. Jasbera.

Inventor:
George M. Traylor,
by Munson & Philipp
Attys.

(No Model.) 5 Sheets—Sheet 5.

G. M. TRAYLOR.
TRAVELING SIGN FOR RAILROAD CARS.

No. 332,306. Patented Dec. 15, 1885.

Attest:
Geo. H. Bott
A. N. Jasbera

Inventor:
George M. Traylor,
by Munson & Philipp
Attys

UNITED STATES PATENT OFFICE.

GEORGE M. TRAYLOR, OF ATLANTA, GEORGIA.

TRAVELING SIGN FOR RAILROAD-CARS.

SPECIFICATION forming part of Letters Patent No. 332,306, dated December 15, 1885.

Application filed September 26, 1884. Serial No. 144,031. (No model.)

*To all whom it may concern:*

Be it known that I, GEORGE M. TRAYLOR, a citizen of the United States, residing in the city of Atlanta, county of Fulton, and State of Georgia, have invented certain new and useful Improvements in Traveling Signs for Railroad-Cars, fully described and represented in the following specification and the accompanying drawings, forming a part of the same.

The present invention relates to devices for displaying advertisements, arranged as a traveling sign within the body of a railroad car or similar vehicle so as to draw the attention of passengers therein to the same, and more particularly to its construction and arrangement and the manner in which motion is communicated from the car-axle to said traveling sign within the car body.

In United States Letters Patent No. 303,470, granted to me August 12, 1884, a practical device for displaying advertisements within the body of a car is embodied, the object of the present invention being, among other things, to improve said patented device in certain particulars, whereby the platform of the car is unobstructed with the driving pulleys and belts, and greater efficiency in the propelling-power is attained.

The invention consists in mounting the pulleys and driving-belts, which communicate the motion from the vertical shaft over the car-roof, so that the platform and the passage-way into the car are unobstructed by moving objects, whether they be inclosed in suitable casings or not; in the means for communicating motion from the car-axle to the vertical shaft, and in certain details of construction and combinations of parts, which will be hereinafter too fully explained to need further preliminary description.

A practical embodiment of the various features of my invention is illustrated in the accompanying drawings, in which—

Figure 8:
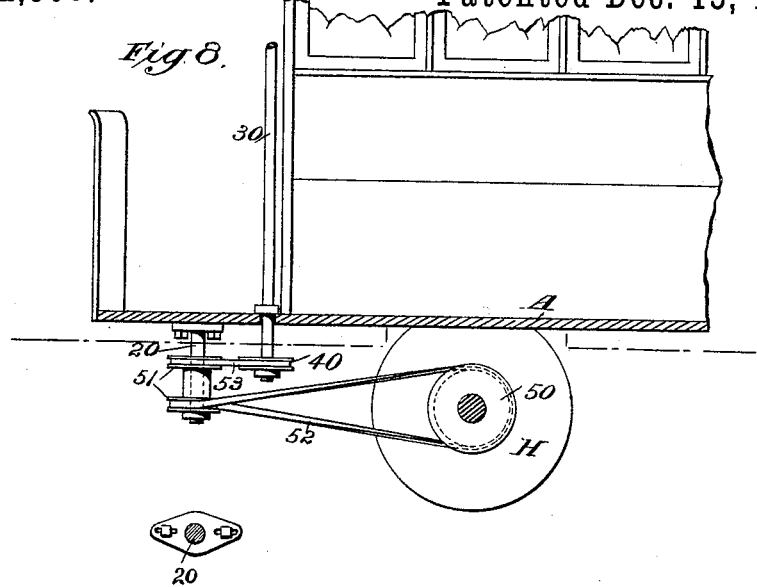
Figure 9:
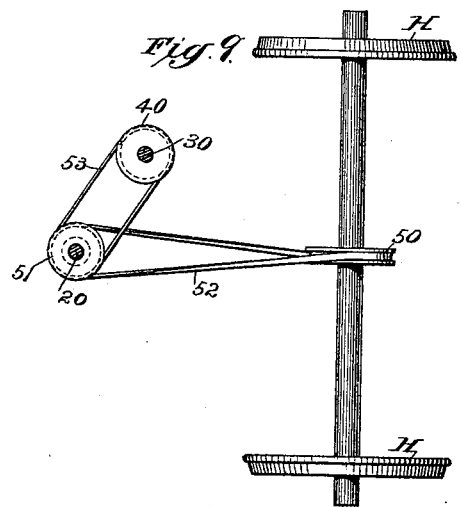
Figure 10:
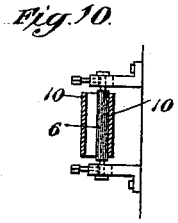

Figure 1 is an end elevation of an ordinary street-railroad car provided with the improvements, the roof and platform of which car are shown in section. Fig. 2 is a longitudinal sectional elevation of the same through the center of the car. Fig. 3 is a plan view of the car, showing particularly the pulleys and their connecting-belts. Fig. 4 is a horizontal section of the car. Figs. 5, 6, and 7 are similar views illustrating modified arrangements of the advertising-aprons. Fig. 8 is a sectional elevation of the lower portion of the car, showing particularly the manner in which motion is communicated from the car-axle to the vertical shaft. Fig. 9 is a plan view of the same; and Fig. 10 is a cross-section of the advertising-apron, taken on the line $xx$ of Fig. 6.

In the arrangement of the present improvements the ordinary type of street-car will sufficiently illustrate its application to all vehicles, said car, as herein shown, consisting of a platform or floor, A, sides B C, ends D E, roof F, doors G, and wheels H. The endless advertising aprons or belts 10, preferably arranged on both sides and in the interior of the car, as shown in Figs. 1, 2, and 4, are mounted to travel around pulleys 11 12, the axes of which are journaled in brackets (either adjustably or not) projecting from the car ends D E, upon the outer side thereof, the said sides being provided with small openings for the passage of the apron through them, all of which is clearly illustrated by said figures, and fully described in my said patent. The upper axes of the pulleys 11 are made of sufficient length to project a suitable distance through an opening in the roof of the car, and are each provided on the outside of the car, over the roof, with a grooved pulley, 74 75. As in my said patent, a vertical shaft, 30, is provided, preferably arranged on one side of the door leading into the car and in close proximity with the car end, its lower end being mounted in the platform or floor A of the car and projecting a short distance below it. It is there provided with a grooved or band pulley, 40, and the upper end of said vertical shaft, projecting a suitable distance through an opening in the roof of the car, and mounted to turn freely therein, is provided on the outside of the car, over the roof, with duplex pulleys 31, from the upper one of which a band, cord, or chain, 33, is stretched to and around the pulley 74, and from the lower one a similar band, cord, or chain, 32, is stretched to and around the pulley 75. Motion is communicated from either of the car-axles to the vertical shaft 30 by a pulley or sprocket-wheel, 50, fast to the axle at or near its center, around which a band, cord, or chain, 52, passes to the lower one of a pair of pulleys, 51, (one of them might be a sprocket-wheel,) which are suitably connected to each other and mounted on a stud, 20, projecting from the under side of the car platform or floor A, at or near the center thereof, the upper member of which pair of pulleys being provided with a band, cord, or chain, 53, around which it passes to the pulley 40 on the lower end of the vertical shaft 30. By the interposition of the pair of pulleys 51, intermediate between the pulley 50 and the one 40, a greater distance may be had for the travel of the twisted band, cord, or chain 52, and room provided for adjusting the same when it becomes stretched from use, or when from any other cause it may need attention and adjustment. It furthermore enables either larger or smaller pairs of pulleys, as the speed may warrant, to be placed on the stud, or a larger or smaller pulley secured to the end of the vertical shaft 30, without interfering one with the other; and in such case the position of the stud carrying the pair of pulleys 51 might be adjustable in any suitable manner, as that seen at Fig. 8, wherein said stud is shown as secured to the under side of the platform by screw-bolts passing through slots formed in the projecting flanges of the stud, so that any change in the size of said pulleys and the pulley 40 may be compensated for without changing the length of their band or cords 52 53, and this adjustment of the stud will also serve as a convenient means of taking up the stretch of said band or cords.

In order that the openings in the roof of the car, through which the several shafts project, as already described, may be protected and prevent the passage of rain or snow or other matter through said openings onto the platform or into the interior of the car, according as the apron-pulleys are positioned either without the car-body, inside the car-body, or in the car ends, as will presently appear, I provide each of the openings in the car-roof with a shield or guard, 60, which is suitably connected with the roof the car, extending upwardly a short distance, and completely surrounding the projecting shafts carrying the pulleys 74, 75, and 31. Attached to each of these shafts below the pulleys or to the under side of the pulleys are funnel-shaped guards 61, which project over the opening of the guards or shields 60, so as to protect said openings and direct all rain or snow to either side thereof, as is clearly shown in Figs. 1 and 2.

Referring to Fig. 5, it will be seen that the apron-pulleys 11 12 are mounted within the car-body, either to the car ends or to the car sides, as may be deemed expedient, the upper ends of which pulleys 11 project through openings in the car-roof, which are protected against the passage of rain or snow into the interior of the car in the manner just described. Such construction, although slightly shortening the length of the aprons, obviates the necessity of providing openings for their passage through said car ends. In building new cars or vehicles in which an advertising medium is to be applied, these apron-pulleys will be preferably built in the car ends, and suitably supported therein by the framing of the car, as seen in Fig. 6, and in such case the structure of the car and its framing may be suited to the travel of the traveling aprons therein, so that the idler-pulleys necessary in cars already in use, as described in my said patent, may be omitted, as their use is objectionable, in that they are apt to and do blur or rub the advertising matter, and thus disfigure and render the apron in time useless. Furthermore, the vertical shaft 30 may be mounted so as to be within the frame-work of the car ends, instead of outside of it, and thus all the driving parts of the device be removed from sight and be thoroughly protected from injury. In cars of great length the advertising-aprons may be arranged to travel from the ends of the car to about midway of their length, and there return around pulleys 12, suitably mounted to the car side, as seen in Fig. 7, in which case each pair of aprons traveling to one end of the car will be driven by the described driving-pulleys and connecting devices at that end, the same pulleys and connecting devices being duplicated for the other end of the car for driving the other pair of aprons; and the direction of the travel of all the advertising-aprons may of course be adjusted by using straight or crossed belts, so as to cause them all to run in one direction or in opposite directions, as is well understood. In this arrangement the shafts of all the apron-pulleys may extend through the car-roof, the openings therein being protected against the passage of rain or snow, as before described, and there provided with pulleys, around which cords or belts may be provided to drive them direct from the vertical shafts, and thus take off any strain which might be on the traveling aprons.

It is preferable in cases where the advertising aprons or belts are stretched straight through the car along its sides, as illustrated in Figs. 6 and 7, or, indeed, where the apron-pulleys are mounted on the outside of the car ends, that one or more small idler-pulleys, 5 6, be arranged within the lengths of the aprons, so that any tendency of the said aprons to sag or unduly vibrate in their travel through the car be counteracted, and the idler-pulley 6 may be held in adjustable bearings mounted in brackets projecting from the car-body, which are provided with set-screws abutting against said bearings, by which the position of the pulley may be adjusted, as seen in Figs. 6 and 10, whereby the stretch of the aprons or belts may be taken up from time to time, as occasion may require. The idler-pulleys 5 6 may be of such a diameter that they will support both lengths of the apron, and whether they be of such diameter or of the diameter shown they may be provided with flanged ends, so that the apron will be directly supported thereby and its sagging prevented.

What I claim is—

1. The combination, with a railroad-car or other carriage, and an endless apron or belt mounted on pulleys and arranged to travel along the car-side within the car-body, of a vertical shaft mounted at or near the car end and provided with a pulley and connections for communicating motion to a driving-pulley mounted on the apron-pulley shaft, both of which pulleys being arranged over the car-roof, substantially as described.

2. The combination, with an endless apron or belt mounted on pulleys and arranged to travel along the car-sides within the car-body, the driven shafts of which apron-pulleys extend through openings in the car-roof, and there provided with pulleys extending over the car-roof, with connections for driving the same from pulleys mounted upon a vertical shaft extending through an opening in the car-roof, of the car-axle and connections by which motion is communicated to said vertical shaft, substantially as described.

3. The combination, with an endless apron or belt mounted on pulleys and arranged to travel along the side of a car, the shaft of one of said pulleys extending through an opening in the car-roof, and provided with a pulley mounted thereon over the car-roof, of a shield provided over the opening in the car-roof and arranged around the shaft of said apron-pulley, and a deflector carried by said shaft or pulley over said shield, substantially as described.

4. The combination, with an endless apron or belt and its pulleys 11 12, the former being provided with a shaft projecting through an opening in the car-roof, of the shield 60, mounted over the opening in said roof and around said pulley-shaft, and a deflector carried by said shaft over said shield, substantially as described.

5. The combination, with the vertical shaft 30, mounted at the car end and extending through an opening in the car-roof, and provided with duplex pulleys 31, of the endless aprons or belts mounted upon pulleys arranged to travel along the car ends, and provided with shafts extending through openings in the car-roof, and having the pulleys 74 75, and connections for driving the same from said vertical shaft, said latter pulleys and connections being arranged over the car-roof, and each of said openings in the car-roof being provided with the shields 60 and the shafts with the deflectors 61, substantially as described.

6. The combination, with the vertical shaft 30, mounted at or near the car end, and provided with the pulley 40 under the platform of the car, of the stud 20, carrying the pair of pulleys 51, and connections with the car-axle by which motion is communicated to said vertical shaft, substantially as described.

7. The combination, with the vertical shaft 30, provided with a pulley under the platform of the car, of the adjustable stud 20, carrying the pair of pulleys 51, and connections with the car-axle by which motion is communicated to said vertical shaft, substantially as described.

8. The combination, with the endless advertising-apron mounted on pulleys and stretched along the side of a car or other carriage, of the idler-pulleys 5 6, arranged within the length of said advertising-apron, the latter pulley being mounted in adjustable bearings, substantially as described.

In testimony whereof I have hereunto set my hand in the presence of two subscribing witnesses.

GEORGE M. TRAYLOR.

Witnesses:
DUDLEY ROBINSON,
JAMES W. MCDADE.